Patented Sept. 1, 1925.

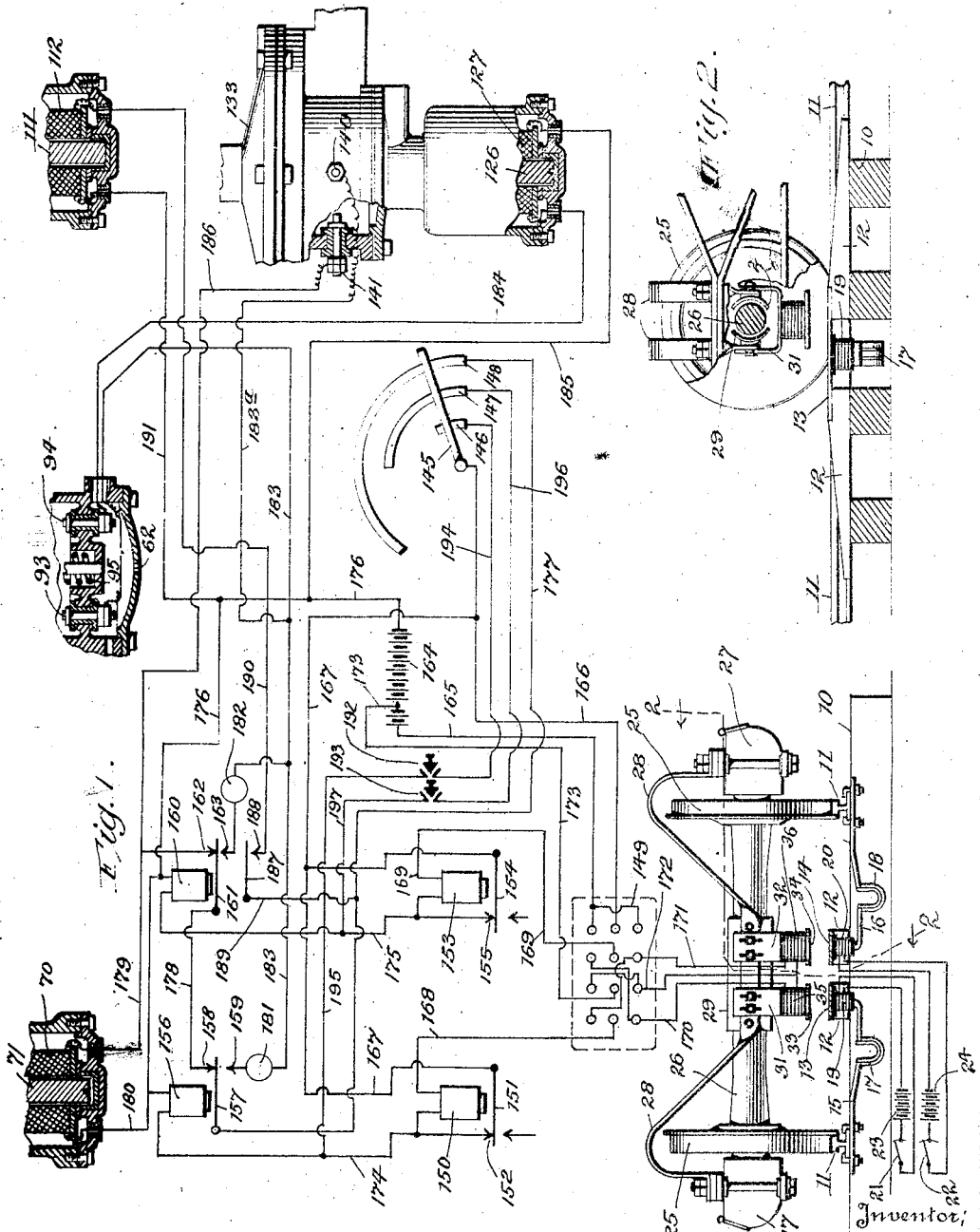

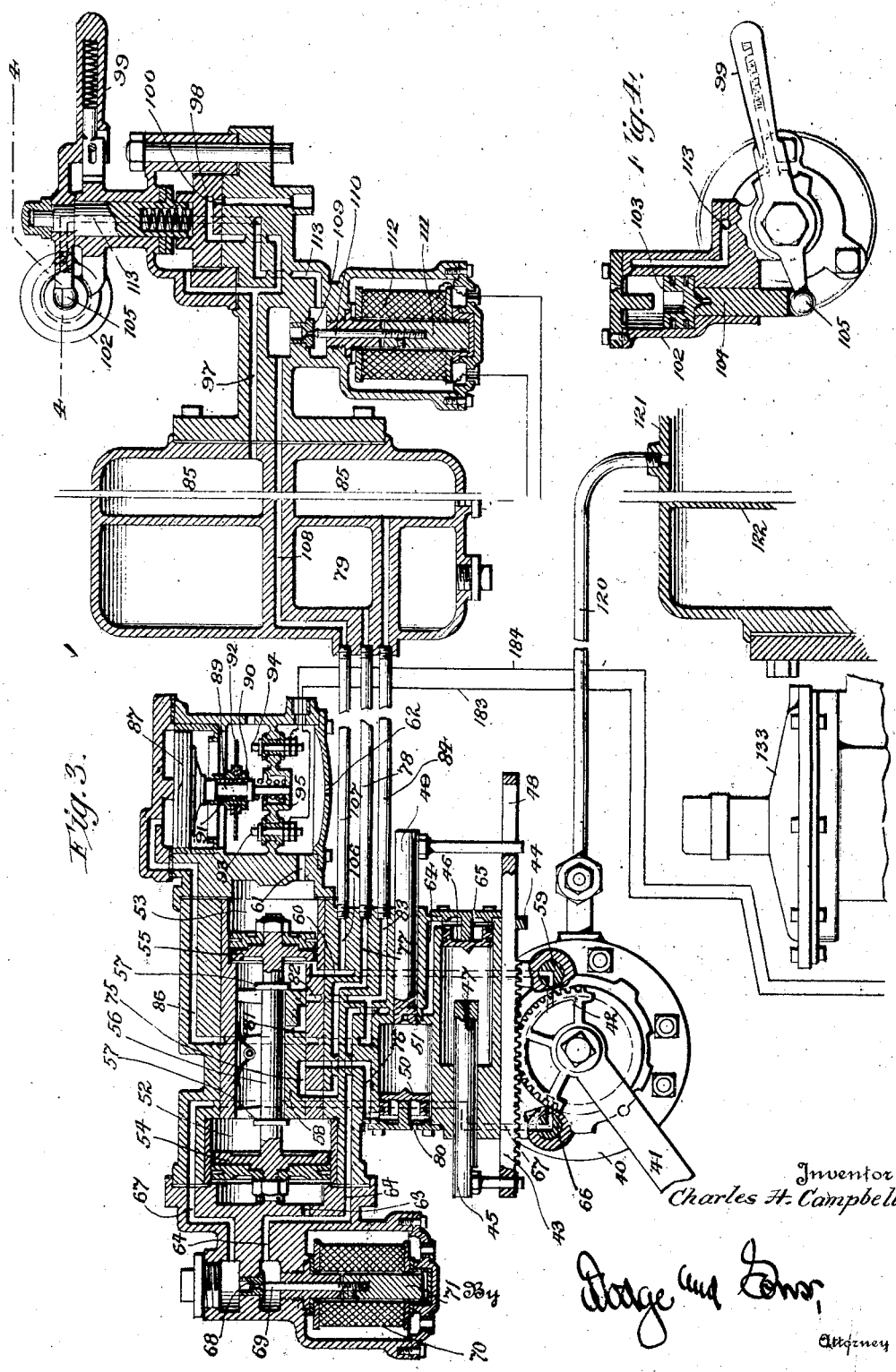

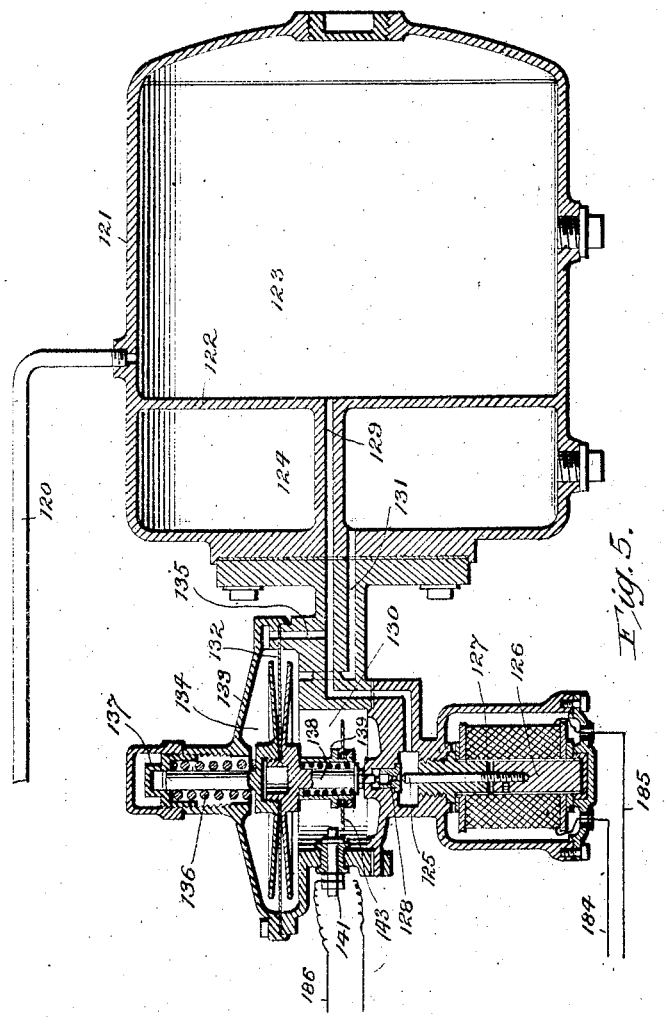

1,552,390

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

AIR BRAKE.

Application filed March 22, 1924. Serial No. 701,192.

*To all whom it may concern:*

Be it known that I, CHARLES A. CAMPBELL, a citizen of the United States, residing at Watertown, in the county of Jefferson and State of New York, have invented certain new and useful Improvements in Air Brakes, of which the following is a specification.

This invention relates to train control systems. Although it is illustrated as embodied in a system of the inductive impulse type, to which it is peculiarly adapted, the invention is capable of embodiment in systems in which the controlling interaction between the track and train is by other than inductive means. Such means are well known in the art and include electric contacts, ramps, track trips, and similar mechanisms.

In some aspects the invention embodies the features characteristic of the system described in a prior application of Vroman and Campbell, Ser. No. 682,423 filed Dec. 24, 1923.

An outstanding characteristic of the present invention is the provision of means for applying the brakes automatically by what is known in the air brake art as a "split reduction." In other words, instead of producing the application by a single relatively severe reduction of brake pipe pressure, the brakes are applied more gradually by a series of smaller reductions occurring at fixed intervals of time, say 30 seconds.

The use of a split reduction application is of vital importance in the case of very long and heavily laden freight trains, as it gives time for the slack to "bunch" and thus avoids severe shocks.

The system provides means for producing automatic applications of the brake under a number of conditions. The system controls maximum train speed; controls the speed of the entrance into a caution block; controls the speed of entrance into a danger block; and includes means by which the engineer is permitted to limit the intensity of an automatically produced brake application under certain conditions; but is not permitted to prevent such an application when, nor to release it so long as, the speed is above values chosen as safe for the particular conditions whose existence puts the control mechanism into action.

The system is intended to operate in conjunction with block signal systems, but is available for use with any signal or controlling mechanism, and may be caused to perform all or only some of the functions above outlined as may be preferred.

In the preferred embodiment, the device limits the speed to any desired maximum, for example, 70 miles per hour. If this maximum be exceeded, a service brake application is automatically made and cannot be limited in intensity while the speed is above the chosen maximum, and can be released only after the speed has been reduced to such maximum.

At a caution indication, provided the speed is above a fixed value, which is hereinafter called the "caution limit," a brake application is made automatically by the split reduction method. The caution limit should ordinarily be about 30 miles per hour. In the case of such an application, the engineer may, at his option, limit the brake pipe reduction to a fixed amount, say 10 pounds, determined by the adjustment of the device, but cannot release the brakes until the speed is reduced to the caution limit.

At a stop indication, provided the speed of the train exceeds a fixed value, hereinafter called the "danger limit," a brake application is made automatically by the split reduction method. The danger limit should be about 15 miles per hour. Until the speed is reduced to the danger limit the brakes will be applied with increasing force by the split reduction method. The engineer cannot suspend action of the device in periodically reducing brake pipe pressure and he cannot release the brakes until the speed is reduced to the danger limit.

In the above description of operation, it has been stated that the application is produced by the split reduction method. Of course, if the first reduction of brake pipe pressure serves to bring the train speed within the proper limit before the termination of the time interval intervening between successive brake pipe reductions, then and in that event, a second reduction need not occur.

The train may pass a caution signal at a speed below the caution limit, or may pass a danger signal at a speed below the danger limit, provided the engineer shall at the time of passing acknowledge the respective signals by operating the corresponding reset or hold-out device, which, in the case of the inductive apparatus herein illustrated, takes the form of a reset switch. The engineer may be compelled to come to a full stop by a danger signal regardless of train speed, if the danger reset or pass switch be so located that it cannot be reached while the train is in motion.

The preferred embodiment of the invention as applied to a stop system of the inductive impulse type is illustrated in the accompanying drawings in which:

Fig. 1 is a diagram of the electrical connections, with certain parts of the apparatus shown in fragmentary section in sufficient detail to permit their ready identification;

Fig. 2 is a section on the line 2—2 of Fig. 1, illustrating the location of the interacting inductive mechanism on track and train;

Fig. 3 is a sectional diagram showing the air connections and showing in detail the mechanism for actuating the engineer's brake valve;

Fig. 4 is a section on the line 4—4 of Fig. 3, and

Fig. 5 is a section showing in detail the mechanism for controlling the brake pipe reduction which is only partially shown in Fig. 3.

Referring first to Figs. 1 and 2, the inductive apparatus for transmitting actuating impulses from stations on the track to the train will first be described. Since both caution and danger signals must be transmitted, this apparatus is constructed in duplicate, and since the train may be headed in either direction on the track, a reversing switch is provided on the train to permit the train-carried apparatus to be connected in proper relation to the track. In discussing Figs. 1 and 2, it will be assumed that this switch is so set that the left hand track elements actuate the left hand set of relays (the danger relays) on the train and the right hand track elements the right hand relays (the caution relays).

Ties are indicated at 10 and track rails at 11. These are of any usual type and may be part of the track circuits of known block signal systems. Mounted on the ties 10 are four supporting timbers 12 alined in pairs parallel with the rails 11. The adjacent ends of each pair are spaced apart to leave an interval for a core and winding hereinafter described and the opposite ends are tapered, as clearly shown in Fig. 2, to deflect any pendent equipment carried by the train which might otherwise cause damage.

At their adjacent ends the tops of timber 12 are gained out to receive flush with their top surfaces elongated pole pieces 13 and 14, one for each pair of timbers. The left hand pole piece 13 is connected by a core 15, including a permanent magnet 17, with the left hand track rail 11, and the right hand pole piece 14 is connected by a core 16, including a permanent magnet 18, with the right hand track rail 11. All the pole pieces and cores are of magnetic material to afford good paths for magnetic flux from each rail 11 to the corresponding pole piece 13 or 14 as the case may be.

Between, and protected by the ends of the timbers 12 are windings 19 and 20. The winding 19 on core 15 is in circuit with a battery 23 and this circuit is controlled by switch 21, which is so arranged as to be opened by the block signal system (not shown) when said system gives a danger indication. Similarly the winding 20 on core 16 is in circuit with a battery 24 and this circuit is controlled by a switch 22, which is so arranged as to be opened by the block signal system when said system gives a caution indication. Both switches 21 and 22 are closed when the block signal system gives a clear indication.

When excited, the windings 19 and 20 neutralize the fields otherwise created by the respective permanent magnets 17 and 18.

The train carried elements to which the track elements just described impart inductive impulses upon the passage of the train are preferably so arranged in connection with one set of truck wheels that these wheels are caused to offer a good magnetic circuit.

Such truck wheels are indicated at 25, 25, and are rigidly connected by the usual axle 26 on which they are fixed. The journal boxes are shown at 27, 27 and are of usual form. Two yokes 28 are supported on the tops of the boxes 27, one forward and the other to the rear of the center line of the axle 26. These arch over the wheels 25 and at their middles extend on opposite sides of the middle portion of axle 26. Here they carry the two iron segments 29, 29, which partly surround axle 26 and are spaced therefrom only a short distance so as to offer the smallest practicable air gaps.

Two stirrup irons 31, 32 are suspended from the yokes 28, and carry pendant cores which terminate in enlarged pole pieces 33, 34. Each of these cores is provided with a corresponding winding 35, 36, connected with train-carried relays.

The track equipment is located only at points where it is desired to transmit a control actuating impulse to the train. At such points a good magnetic path is afforded through both the track and train coils. For the left hand coils, for example, it is as follows: pole piece 33, stirrup 31, segment 29, axle 26, left wheel 25 and rail 11, core 15 to pole piece 13. The air gap between 13 and 33 is adjusted by adjusting stirrup 31, four inches being satisfactory.

Windings 35 and 36 are constantly excited. Under clear conditions, windings 19 and 20 are energized, and when the train passes no impulse is induced in windings 35 or 36 such as would operate the relays hereinafter described. Under danger or caution conditions coil 19 or 20 is open-circuited and the field created by the corresponding permanent magnet 17 or 18 is effective to induce a reverse impulse in the corresponding coil 35 or 36 and thus actuate the corresponding relay.

Before discussing the relays actuated by the impulses generated in coils 35 and 36, and the connecting circuits, it is desirable to describe the construction and operation of the brake applying mechanism. This is shown in Fig. 3.

An engineer's brake valve of the usual equalizing discharge type is illustrated generally at 40. The handle 41 is provided with a sector gear 42, which meshes with a sliding rack 43. The rack 43 slides in a guide 44 and is connected with a piston rod 45. The rod 45 is arranged to be forced to the left by a piston 46 working in a cylinder 47, and the parts are so dimensioned that at the left hand limit of motion of the piston 46, the valve handle 41 will be in service application position. From this position it can be moved further manually.

The rack 43 is connected by means of a lost motion, pin and slot connection 48 with a second piston rod 49, and this rod 49 is arranged to be forced to the right by a piston 50 working in a cylinder 51. The parts are so dimensioned that when the piston 50 is at its right hand limit of travel, the engineer's brake valve handle 41 will be in lap position.

Adjacent the cylinders 47 and 51 is a differential cylinder and valve chamber consisting of two cylinder portions 52 and 53; 52, the one at the left (as seen in Fig. 3), being the larger.

A differential piston structure is mounted in the differential cylinder, and includes a large head 54, a small head 55, and a connecting stem 56 provided with annular lugs 57, 57, which straddle a slide valve 58. The space within the differential cylinder between the pistons 54 and 55 is subject to main reservoir pressure, taken from the space above the rotary valve of the engineer's brake valve 40 by way of plug cock 59 and port 60. The space to the right of piston 55 is open to atmosphere through ports 61, 62.

The space at the left hand side of piston 54 is normally subject to atmospheric pressure because it is connected by ports 63 and 64, with the space to the right of piston 46, and this space is vented to atmosphere by means of a minute port 65 whose function is to vent the cylinder 47 to the atmosphere, except when air under pressure is actively supplied thereto at a rate greater than the capacity of port 65.

Under these circumstances, the differential piston structure 54, 55 stands in its left hand position, as shown in Fig. 3, and this is the normal condition. The space above the rotary valve of the engineer's brake valve 40 is connected by a plug cock 66, and port 67, with a valve seat 68 of a pin valve 69. This valve is normally held closed through the excitation of a solenoid 70 which acts upon an armature 71 connected with the valve 69. The valve 69, when opened, admits air to the port 64, and hence to the space at the right of piston 46, thus moving the engineer's brake valve to service application position. At the same time it causes the differential piston structure 54, 55 to move to the right, shifting the valve 58. The reason for this is that when main reservoir air is admitted by the valve 69 through the port 64, 63, the pressure on the two sides of piston 54 will be equalized. Consequently, piston 55 is subject to main reservoir pressure on its left side and atmospheric pressure on its right side, and thus serves to shift the entire piston structure to the right.

In the left hand position of the valve 58, a groove 75 connects a port 76 leading to the left hand side of piston 50 with a port 77 connected by a pipe 78 with a reservoir or chamber 79 known as the lap chamber. The space at the left of the piston 50 is vented to atmosphere by a minute port 80 so that normally the chamber 79 is at atmospheric pressure. If, however, the chamber 79 be charged with air under pressure while disconnected from port 76, and if it then be connected with said port, the pressure fluid will move the piston 50 to the right and retain it in that position until the pressure bleeds away through the port 80.

In the left hand position of the valve 58, all other ports controlled by the valve are closed. In the right hand position of valve 58, communication between the ports 76 and 77 is interrupted and a port 81 in the valve 58 allows main reservoir air from the space between the differential pistons to enter a port 82 in the valve seat. The port 82 branches and one branch thereof, 83, leads by way of a pipe 84 to a so-called timing chamber 85, whose volume is about four or five times that of the lap chamber 79. This ratio is subject to variation and is suggested merely to avoid any misconception based on the breaking away of this chamber in Fig. 3 of the drawings.

The other branch of the port 82 is shown at 86, and leads to the space above a piston 87 working in a cylinder 88. On its lower face, the piston 87 carries a stem 89, upon which is yieldably mounted a collar 90, urged downward by a spring 91. The collar 90 carries, insulated from itself, an annular contact 92, which, in the lower position of piston 87, bridges two contacts 93 and 94, which are insulated from their supporting frame, and which together with the bridging contact 92 form what is called the interval limiting switch, for the reason that this switch controls a circuit, which, when broken, terminates the interval between successive brake pipe pressure reductions by initiating a new brake pipe reduction.

It will be observed that the timing chamber 85 and the space above the piston 87 are in communication with each other, and that when the differential piston 54, 55 moves to the right, when an application is automatically made, the chamber 85 is charged with main reservoir air. The piston 87 then moves down, closing the interval limiting switch.

A port is provided to bleed the timing chamber at a restricted rate so that after a definite time interval the piston 87 will be moved upward by its opposing spring 95, and will open the interval limiting switch. This bleed port might lead directly to atmosphere but under certain conditions it is desirable to enable the engineer manually to prevent the second brake pipe reduction after the first has been made. For that reason, the vent port 97, from chamber 85, is caused to lead to the seat of a rotary valve 98 which is arranged to be turned by handle 99. The rotary valve 98 has a constricted port 100, which in normal position of the rotary valve connects the port 97 with the atmosphere. By shifting the handle 99, the engineer may terminate the venting from chamber 85.

It must not be possible to leave the valve 98 in this abnormal position for the reason that if it be so left, part of the mechanism will be rendered inoperative on subsequent automatic applications. It is not, however, feasible to use a simple spring mechanism to return the valve for the reason that the engineer must be free to release the handle 99 and manipulate other apparatus in the engine cab. Consequently, I provided a pneumatic motor which operates to restore the valve 98 whenever the device is reset. This has the incidental but important advantage that it makes it possible to energize the motor under certain danger conditions and thus prevent the engineer from moving the handle 99 to terminate the successive brake pipe reductions.

The cylinder of this motor is indicated at 102 in Fig. 3. and its construction is shown in section in Fig. 4. It includes a piston 103 mounted in the vented cylinder 102, and acting against a plunger 104, which engages an extension 105 on the handle 99. Main reservoir air for operating this motor is taken through port 106 of the space between the differential piston 54, 55, and is conducted by way of the pipe 107 and port 108 to the seat 109 of a pin valve 110.

The valve 110 is provided with an armature 111 and is held closed by a solenoid 112, when the latter is excited. When the solenoid 112 is deenergized, air flows from the port 108 to the seat 109, and the port 113, through which it arrives at the interior of cylinder 102. As will be further explained, the solenoid 112 is deenergized whenever the resetting mechanism is actuated, i. e., after every automatic operation of the stop mechanism. Furthermore, it can be deenergized by means under the control of the automatic stop mechanism to prevent the engineer from moving the valve 99 to limit the functioning of the stop mechanism. The details of these connections are subject to some variation but the embodiment illustrated and hereinafter described in detail is believed to be the best.

In this apparatus it is desirable to have some means of timing the brake pipe reduction caused by each movement of the engineer's brake valve to application position, and some means directly responsive to a desired brake pipe reduction to move the engineer's valve to lap position. This result can be satisfactorily accomplished by means associated with the equalizing reservoir which reservoir forms a part of all equalizing discharge brake valves.

In Fig. 3 the pipe connection leading to the equalizing discharge reservoir is shown at 120 and the shell of the reservoir is generally indicated at 121. The detailed construction of the reservoir, and its associated apparatus, is shown in Fig. 5, to which reference will now be made.

The space within the shell 121 is divided by a partition wall 122, into two chambers 123, and 124; the chamber 124 being of decidedly less volume. In the ordinary manual operation of the brakes, these two chambers are in communication with each other, and their aggregate volume therefore is preferably made to conform to that of conventional equalizing reservoirs. During the functioning of the automatic brake applying mechanism, these two chambers are at times isolated from each other, the chamber 123 performing the normal functions of an equalizing reservoir, and the chamber 124, known as the reduction limiting chamber, serving in conjunction with a loaded diaphragm to operate a limiting switch when the pressure in chamber 123 has fallen a desired amount below the pressure in chamber 124.

To separate the chambers 123 and 124, a pin valve 125, under the control of an armature 126, and a solenoid 127 are provided. The seat 128 of the valve 125 serves as a connection between a port 129 leading from the chamber 123 and a space 130 which is in communication with the chamber 124, by way of the port 131. A diaphragm 132 is subject, on its lower side to the pressure in the chamber 130, and is held in place by a cap 133, which forms a chamber 134, connected by a port 135, to port 129, and hence with chamber 123. The diaphragm 132 is clamped between suitable thrust plates and is urged downward, i. e., in the direction of the chamber 130, by a spring 136, which may be variably loaded by a nut 137, threaded into the cap 133. A downward projecting stem 138 carries a sleeve 139 and on this is mounted an annular bridging contact 143 which is insulated from the sleeve 139, and which in the upward position of the diaphragm 132 bridges contacts 140, 141 (see Fig. 1). A spring 142 interposed between the stem 138 and the sleeve 139 allows a slight yielding of the contact element 143, sufficient to insure good contact.

Under normal conditions, the solenoid 127 is deenergized and if the engineer's brake valve is in running position, the chambers 123 and 124 will both be charged to brake pipe pressure. When an automatic application is made by the train stop mechanism, solenoid 127 is energized, cutting off communication between chambers 123 and 124. At the same time the application of the brakes by means of the engineer's valve causes a drop in pressure in the chamber 123, while the pressure in the chamber 124 remains unchanged. When the pressure in chamber 123 drops sufficiently the pressure in the chamber 130 will force the diaphragm upward against the resistance of spring 136. The pressure differential necessary to perform this function can be fixed by adjusting the stress on spring 136, by means of nut 137. When diaphragm 132 moves upward, the contact member 143 will bridge the contacts 140 and 141, establishing a circuit which functions, as hereinafter explained, to terminate the brake pipe reduction by moving the engineer's valve to lap position.

The system also includes a speed responsive switch, whose exact form is immaterial, as many forms capable of performing the function are familiar to those skilled in the art. This switch appears in Fig. 1 and includes an arm 145, which moves counterclock-wise as train speed increases, such movement being caused by a centrifugal or other equivalent mechanism driven by a wheel of the train. When the train is at rest and up to the danger limit, it is in contact with three arcuate contacts 146, 147, and 148, which subtend unequal angles.

The contact 146 controls the reset circuit for the danger (stop) relay, and is cleared by the arm 145 at the danger limit, so that above this speed the danger relay cannot be reset and cannot be prevented from acting. The contact 147 controls the reset circuit for the caution relay and is cleared by the arm 145 at the caution limit so that above this speed the caution relay can neither be reset nor prevented from acting. The contact 148 controls the main exciting circuit of coil 70 so that above this speed a brake application will be made.

The reversing switch heretofore mentioned is merely a four pole double throw switch, illustrated in diaphragm in Fig. 1 at 149. The switch contacts, furthest to the right, control the main battery lead to the centrifugal switch arm 145. The remaining three sets of contacts control the connections to coils 35 and 36 (which have a common return wire) and this switch operates when thrown to its opposite positions to transpose the coils 35 and 36, so that either may be set to operate the caution and the other, the stop relays, at will.

The circuits will be traced as they are when the middle contacts are connected with the lower contacts. The interchange effected by the switch can readily be understood from Fig. 1.

Four relays are used, two being called primary relays, and two secondary relays. The primary relay armatures control the passage of current through their magnet coils so these relays must be reset by closing special resetting circuits. The secondary relays reset themselves, the circuits through their magnets not being controlled by their armatures.

The primary danger relay has a coil 150, an armature 151, and contact 152. The primary caution relay has a coil 153, armature 154, and contact 155. The secondary danger relay has a coil 156, armature 157, and two contacts 158 and 159. The secondary caution relay has a coil 160, an armature 161, and two contacts 162 and 163.

The source of energy is a storage battery 164 which may be maintained charged in any suitable manner. In order to secure different voltages from the battery, certain of the circuits are connected into the battery at a point intermediate its end terminals.

The exciting circuit for the primary relays is: battery 164; wire 165; switch 149; wire 166; wire 167, thence in parallel by armatures 151, 154; contacts 152, 155; coils 150, 153; wires 168, 169; switch 149 (two contacts) wires 170, 171; coils 35, 36 to a common return wire 172, which leads through switch 149 to wire 173 to an intermediate terminal on battery 164. This gives low voltage excitation to coils 150, 35, 153 and 36.

The secondary relay coils are connected in parallel circuits as follows: contacts 152, 155; wires 174, 175; coils 156, 160 to a common return wire 176 leading to the end terminal of battery 164. Thus the secondary relays are excited at full battery voltage, coil 156 being controlled by armature 151 and coil 160 by armature 154.

The circuit which normally excites magnet coil 70 is as follows: battery 164; wire 165; switch 149; wire 166; switch arm 145; speed limiting contact 148; wire 177; armature 157; contact 158; wire 178; armature 161; contact 162; wire 179; coil 70; wire 180; wire 176 to battery 164. This subjects the excitation of coil 70 concurrently to independent control by speed control switch arm 145; armature 157, and armature 161. If either armature 157 or 161 should drop as a result of deenergization of coil 156 or 160 respectively, circuits will be established alternatively as follows: battery 164; wire 165; switch 149; wire 166; arm 145; contact 148; wire 177; armature 157 (or 161); contact 159 (or 163) danger signal lamp 181 (or caution signal lamp 182) wire 183; contacts 93, 92, 94 (which will close immediately upon the commencement of an automatic actuation); wire 184; coil 127; wire 185 to battery 164.

A branch wire 183ª leads from the wire 183 to contact 140, and when contact 143 connects contact 140 with contact 141, a shunt circuit will be completed leading from contact 141 as follows: wire 186; wire 179; coil 70; wire 180; wire 176 to battery 164.

Connected with the armature 161 is a second switch arm 187 which co-acts with a contact 188. When the armature 161 falls it therefore establishes another circuit as follows: battery 164; wire 165; switch 149; wire 166; switch arm 145; contact 148; wire 177; wire 189; switch arm 187; contact 188; wire 190; coil 112; wire 191; wire 176 to battery 164.

The resetting of primary relays 150 and 153 is effected by corresponding, manually operable, normally open reset switches 192 (danger reset switch), and 193 (caution reset switch) respectively. The circuits through these reset switches are respectively controlled by the speed control switch arm 145. The danger reset circuit is as follows: from battery to arm 145 as previously described; contact 146; wire 194; switch 192; wire 195; coil 150; wire 168; switch 149; wire 170; coil 35; wire 172; switch 149; wire 173 to intermediate connection on battery 164. Similarly, the caution reset circuit is as follows: battery to arm 145 as before described; contact 147; wire 196; switch 193; wire 197; coil 153; wire 169; switch 149; wire 171; coil 36; wire 172; switch 149; wire 173 to intermediate connection on battery.

Under normal conditions primary relay coils 150 and 153 are excited, and hence secondary relay coils 156 and 160 are excited. Consequently the armatures 157 and 161 are in their upper positions against contacts 158 and 162, and contact 187 is in its upper position clear of contact 188. Under these circumstances solenoid 70 is excited, solenoid 112 is deenergized, and solenoid 127 is deenergized.

The differential piston 54, 55 is in its left-hand position as shown in Fig. 3. The space to the right of application piston 46 is at atmospheric pressure, as is the space to the left of lap piston 50. The space above the timing piston 87, is at atmospheric pressure, and this piston is in its upper position in which bridging contact 92 clears contacts 93 and 94.

The engineer's valve is entirely free to be operated manually and the equalizing reservoir has an effective volume equal to the total spaces 123 and 124, which are in communication with each other. In normal running condition, with the brakes released, the equalizing reservoir is charged with air at brake pipe pressure.

Assume that the train is approaching a caution signal at a speed below the caution limit, and the engineer desires to enter the block. He may do so without occasioning an automatic application of the brakes, provided he holds the caution hold-out switch 193 closed as he passes the signal. The reason for this is that below the caution limit, arm 145 is in contact with sector 147, rendering the hold-out switch 193 operative to prevent the armature 151 of the primary danger relay from dropping. If this switch be closed, the relay does not function.

Similarly, the engineer may enter a danger block at a speed below the danger limit, provided he holds the danger hold-out switch 192 closed as he passes the danger signal and enters the block. These functions are present in the device of the application above identified, and hence are not broadly claimed herein.

Suppose, now, that the engineer is disabled or careless and that the train enters a caution block at a speed above the caution limit. At this speed, the hold-out switch 193 will not function for the reason that its circuit is interrupted by the separation of the arm 145 and contact 147 so that malicious interference is impossible. The primary caution relay functions and its armature 154 drops. The effect of this is to deenergize the coil 160 of the secondary caution relay. Consequently armature 161 and switch arm 187 drop against the contacts 163 and 188 respectively. Since the primary relay does not reset itself, and since it cannot be reset by the hold-out switch 193, until arm 145 again contacts with contact 147, the armature 161 and switch arm 187 must remain in their lower positions.

When armature 161 leaves contact 162, solenoid 70 is deenergized. When armature 161 touches contact 163 it establishes circuits through the caution lamp 182 to contact 140 of the brake pipe reduction limiting switch, and to contact 93 of the timing switch. The timing switch is closed immediately upon the deenergization of solenoid 70, as will be later explained, so that the effect is immediately to light lamp 182 and establish a circuit by way of wire 183 to contacts 93, 92, 94, and wire 184 through solenoid 127 to the battery. The resulting excitation of solenoid 127 closes valve 125 and ends communication between chambers 123 and 124. When switch arm 187 touches contact 188, it excites solenoid 112 and closes valve 109.

The effect of the deenergization of the solenoid 70 and the resulting opening of valve 69 is to admit main reservoir air against the left-hand side of piston 54 so that the differential piston structure 54, 55 moves to the right, carrying the slide valve 58 to its right-hand position. At the same time, main reservoir air flows through the port 64 at a rate in excess of the capacity of bleed port 65 and moves the application piston 46 forcibly to the left. This shifts rod 45 and rack 43 to the left, and moves brake handle 41 to service application position.

The movement of valve 58 to its right-hand position establishes several connections. It allows main reservoir air to flow by way of port 77 and pipe 78 to the lap chamber 79, charging this chamber to main reservoir pressure, at the same time terminating the communication between the lap chamber 79 and cylinder 51 by way of groove 75 and port 76. It admits main reservoir air by way of ports 81 and 82, both to the timing chamber 85 (by way of port 83 and pipe 84) and to the space above the timing piston 87 by way of port 86. Consequently, timing piston 87 immediately moves downward, causing contact 92 to bridge the contacts 93 and 94 as above mentioned.

The action of the engineer's brake valve in service application position is to vent air from the chamber 123 through the rotary valve forming a part of the engineer's brake valve. Since valve 125 is closed by the energization of solenoid 127, the diaphragm 132 is subject, on its upper side, to the reduced pressure in chamber 123, and on its lower side, to the original brake pipe pressure confined in chamber 124 by the closing of valve 125. When the pressure differential between chambers 123 and 124 is sufficient to overcome the stress of spring 136, the diaphragm moves upward, and contact 143 bridges the contacts 140 and 141. This establishes a shunt circuit which reenergizes the solenoid 70 and thus closes the valve 69.

The pressure at the right of application piston 46 bleeds away through port 65, and since this space is connected by the ports 64, 63 with the space to the left of piston 54, the pressure acting in the left side of piston 54 soon falls to atmospheric, causing the differential piston structure 54, 55 to move back to its left-hand position shown in Fig. 3.

The lap chamber 79 is now connected with the space to the left of lap piston 50 by pipe 78, port 77, groove 75, and port 76, and the pressure in the lap chamber acting on the piston 50 moves this piston to the right and serves to shift the engineer's brake valve to lap position. The port 80 is insufficient in capacity to interfere with the action of lap piston 50, but after the completion of the movement of the engineer's valve to lap position, it allows the pressure in the cylinder 51 and lap chamber 79 to bleed away until atmospheric pressure exists. The lapping of the engineer's brake valve of course terminates the fall of pressure in chamber 123.

The space above timing piston 87 remains in communication with the timing chamber 85, and the timing chamber 85 is vented to atmosphere through port 97 and bleed port 100 in the rotary valve 98. Ultimately, the pressure in the timing chamber 85 will be reduced to a point at which the spring 95 moves the piston 87 upward, carrying contact 92 away from contacts 93 and 94.

The volume of timing chamber 85 and the size of port 100 are designed to give an appropriate time interval, say 30 seconds. The upward movement of contact 92 deenergizes solenoid 127, allowing the pressures in chambers 123 and 124 to equalize. Spring 136 then moves the diaphragm 132 downward and contact 143 moves clear of contacts 140, 141. This again deenergizes the solenoid 70 and initiates a new series of operations, producing another reduction in brake pipe pressure and a further application of the brakes. Such reductions may occur successively, and the amount of each reduction corresponds to the setting of the spring 136.

Whenever train speed is below the caution limit, the engineer may terminate the action of the device by closing the caution reset switch 193, and when the device is so reset, the engineer's brake valve may be manually moved to release or running position.

At speeds above the caution limit, and after the first reduction of brake pipe pressure has been made, as a result of passing a caution signal, the engineer may prevent further reductions by shifting the handle 99 so that bleed port 100 is closed. This is made possible by the fact that solenoid 112 is energized, so that cylinder 102 is not supplied with pressure fluid from the main reservoir.

If the engineer passes a danger signal at a speed above the danger limit, the danger reset switch 192 is obviously inoperative. The primary danger relay functions to deenergize the coil 156 of the secondary danger relay and armature 157 drops away from contact 158 and against contact 159. The effect is the same as before, except that danger lamp 181 is lighted instead of caution lamp 182, and the engineer is unable to terminate the periodic reduction of brake pipe pressure by the manipulation of the handle 99.

The reason that he is then unable to manipulate the handle 99 is that switch arm 187 is controlled only by the secondary caution relay 160, so that when the danger relay is actuated solenoid 112 remains deenergized and piston 103 is subject to main reservoir pressure. The piston 103 exerts sufficient force to preclude manual movement of the handle 99. Thus, under danger conditions, the engineer is unable to terminate the successive reduction of brake pipe pressure until the train speed has been reduced to the danger limit, at which time the danger reset switch 192 again becomes operative and makes it possible to reset the primary danger relay.

If the engineer exceeds the maximum speed limit, arm 145 clears contact 148 and deenergizes solenoid 70. This action ordinarily takes place at a very slight excess of speed, and the resulting reduction in train speed will, under ordinary circumstances, very quickly restore the circuit and permit the engineer to release the brakes. It is important to note, however, that with the circuits as shown in Fig. 1, the action under excess speed does not cause either armature 157 or armature 161 (with its connected switch 187) to drop. Consequently, the circuit through solenoid 112, and the circuit through the timing switch 92, 93, 94, and solenoid 127, are not completed. Therefore, the engineer's valve will be moved to service application position, and must remain there until a full service application has been made, or until an appropriate reduction of speed shall have restored the excitation of solenoid 70, permitting the engineer to lap or release the brakes.

Obviously, the connections might be modified somewhat for the purpose of changing the characteristics of operation, but the arrangement shown is believed to meet best the requirements of service. For example, a switch similar in form and function to the switch 187 might be connected in parallel with it, and might be operated by the armature 157, but this would merely be a duplication of the arrangement shown, and hence need not be illustrated. Its necessary exclusion, however, is not implied. If it be thought desirable that the engineer be unable to terminate the cyclic action of the brake applying means, even under caution conditions, the valve 98 might be omitted, and a fixed bleed port might be substituted for the controlled bleed port 100. This would permit the elimination of the cylinder 102, its controlling solenoid 112, and related parts.

The use of the valve 98 and its resetting device is preferred because it is thought desirable for the engineer to have a wider range of control under caution than under danger conditions. The motor and its solenoid control enable the engineer to terminate the cyclic action and then release the handle 99 with assurance that upon the termination of the automatic action of the device the handle 99 will be restored to its normal position.

What is claimed is:

1. In an automatic train control device, the combination of an automatic air brake system including a normally charged brake pipe; a train controlling mechanism serving to transmit control actuations from the track to a moving train; brake applying means arranged to be actuated by said controlling mechanism and when so actuated, serving to produce at approximately equal time intervals successive approximately equal reductions of brake pipe pressure; and manually operable means for preventing such successive pressure reductions, after the first.

2. In an automatic train control device, the combination of an automatic air brake system including a normally charged brake pipe; a train controlling mechanism arranged to transmit control actuations from the track to a moving train; brake applying means arranged to be actuated by said controlling mechanism and serving when so actuated to produce successive reductions of brake pipe pressure; and a device, normally inoperable and rendered manually operable by the functioning of the controlling mechanism under certain conditions, and serving when operated to prevent such pressure reductions except the first.

3. In an automatic train control device, the combination of an automatic air brake system including a normally charged brake pipe; an inductive mechanism serving to transmit impulses from stations on the track to the train, and including a relay switch; a normally closed magnet valve controlled by said relay switch; a motor mechanism adapted to be put into action by the opening of said magnet valve; and a brake valve serving to control the pressure in said brake pipe and operatively connected with said motor mechanism to be moved thereby alternately between application and lap positions.

4. In an automatic train control device, the combination of an automatic air brake system including a normally charged brake pipe; an inductive mechanism serving to transmit impulses from stations on the track to the train, and including a relay switch; a normally closed magnet valve controlled by said relay switch; a motor mechanism adapted to be put into action by the opening of said magnet valve; a brake valve serving to control the pressure in said brake pipe and operatively connected with said motor mechanism to be moved thereby alternately between application and lap positions; and manually operable means for terminating the action of said motor mechanism when said valve is in lap position.

5. In an automatic train control device, the combination of an automatic air brake system including an engineer's brake valve; a train controlling mechanism arranged to transmit control actuations from the track to a moving train; and means arranged to be actuated by said controlling mechanism, and when so actuated serving to move said engineer's brake valve to service application position and then alternately to lap and service application positions.

6. In an automatic train control device, the combination of an automatic air brake system including an engineer's brake valve; a train controlling mechanism arranged to transmit control actuations from the track to a moving train; means arranged to be actuated by said controlling mechanism, and when so actuated serving to move said engineer's brake valve to service application position and then alternately to lap and service application position; and manually operable means for causing said engineer's brake valve to come to rest in lap position.

7. In an automatic train control device, the combination of an automatic air brake system including an engineer's brake valve; a train controlling mechanism arranged to transmit control actuations from the track to a moving train; means arranged to be actuated by said controlling mechanism, and when so actuated serving to move said engineer's brake valve to service application position and then alternately to lap and service application positions; and a device, normally inoperable and rendered manually operable by the functioning of said controlling mechanism under certain conditions, and serving when operated to cause the engineer's valve to come to rest in lap position.

8. In an automatic train control device, the combination of an automatic air brake system including an engineer's brake valve; a train controlling mechanism arranged to transmit distinct caution and danger controlling actuations from the track to a moving train; means arranged to be set into operation by said caution and by said danger controlling actuations, and serving to move the engineer's brake valve to service application position and then alternately to service application and lap positions; and means rendered manually operable by a caution actuation, and serving when operated to cause said engineer's brake valve to come to rest in lap position.

9. In an automatic train control device, the combination of an automatic air brake system including an engineer's brake valve; a train controlling mechanism including independently operable inductive mechanisms, one for caution and the other for danger actuations, and each including a corresponding relay switch; a motor mechanism arranged to be set into operation by the action of either relay switch, and serving to move the engineer's brake valve to service application position, and then alternately between service application and lap positions; and means rendered manually operable by the actuation of the caution relay switch and serving, when operated, to bring said motor to rest with the engineer's valve in lap position.

10. In an automatic train control device, the combination of an automatic air brake system including an engineer's brake valve; a train controlling mechanism including independently operable inductive mechanisms, one for caution and the other for danger conditions, and each including a corresponding relay switch; an application motor arranged to be put into action by either of said relay switches and serving, when so put into action, to move the engineer's brake valve to application position; a lap motor serving when actuated to shift the engineer's brake valve to lap position; means controlled by the pressure reduction produced by said engineer's valve in application position and serving to put said lap motor into action, and said application motor out of action; and a timing mechanism arranged to be put into action by said relay switches and serving periodically to actuate said application motor.

11. In an automatic train control device, the combination of an automatic air brake system including an engineer's brake valve; a train controlling mechanism including independently operable inductive mechanisms, one for caution and the other for danger actuations, and each including a corresponding relay switch; an application motor arranged to be put into action by either of said relay switches and serving, when so put into action, to move the engineer's brake valve to application position; a lap motor serving when actuated to shift the engineer's brake valve to lap position; means controlled by the pressure reduction produced by said engineer's valve in application position and serving to put said application motor out of action and said lap motor into action; a timing device arranged to be put into action by said relay switches and serving periodically to actuate said application motor; and a device rendered manually operable by the actuation of one of said relay switches and serving, when operated, to suspend the recurrent action of said application motor.

12. In an automatic train control device, the combination of an automatic air brake system including a normally charged brake pipe and an engineer's brake valve; a train controlling mechanism including two independently operable inductive mechanisms, each including a corresponding relay switch; a pneumatic motor mechanism arranged to be set into action by either of said relay switches and having a lost motion connection with the engineer's brake valve through which the motor mechanism moves the brake valve to service application position and to lap position in the opposite positions of the motor mechanism; means subject to the pressure reduction caused by the brake valve in application position for actuating the motor mechanism to valve lapping position; a timing device serving after its initial action to actuate the motor mechanism in the reverse direction at chosen time intervals; and a device normally inoperable, rendered operable by one of said relay switches and serving, when operated to terminate the movements of said engineer's valve in lap position.

13. In a train control device, the combination of means for transmitting actuations from the track to a moving train; a normally excited magnet valve arranged to be deenergized by such actuation; an engineer's brake valve; an application motor arranged to move the engineer's brake valve to application position; a lap motor arranged to move the engineer's brake valve to lap position; a lap valve mechanism arranged to accumulate air under pressure in one position and to admit said accumulated air to the lap motor in another position; connections whereby the deenergization of the magnet valve actuates the application motor and moves the lap valve mechanism to air accumulating position; connections whereby the energization of the magnet valve deenergizes the application motor and moves said lap valve to admitting position; a reduction limiting device serving to reenergize said magnet valve and itself actuated in accordance with the reduction of brake pipe pressure; and a timing device set in action upon the initial deenergization of said magnet valve and serving periodically to suspend the reenergization of said magnet valve by said limiting device.

14. In a train control device, the combination of means for transmitting actuations from the track to a moving train; a normally excited magnet valve arranged to be deenergized by such actuation; an engineer's brake valve; an application motor arranged to move the engineer's brake valve to application position; a lap motor arranged to move the engineer's brake valve to lap position; a lap valve mechanism arranged to accumulate air under pressure in one position and to admit said accumulated air to the lap motor in another position; connections whereby the deenergization of the magnet valve actuates the application motor and moves the lap valve mechanism to air accumulating position; connections whereby the energization of the magnet valve deenergizes the application motor and moves said lap valve to admitting position; a reduction limiting device serving to reenergize said magnet valve and itself actuated in accordance with the reduction of brake pipe pressure; and a timing device serving periodically to suspend the reenergization of said magnet valve by said limiting device.

15. In a train control device, the combination of means for transmitting controlling actuations from the track to a train; a normally closed switch opened thereby; a normally closed magnetic valve controlled by said switch; an engineer's brake valve; a pneumatic application motor arranged to move the engineer's valve to application position; a pneumatic lap motor arranged to move the engineer's brake valve to lap position; a lap valve mechanism serving to admit pressure temporarily to said lap motor; connections whereby the deenergization of said magnet valve admits pressure to the application motor, and the reenergization of the magnet valve relieves the application motor and actuates the lap valve mechanism; a reduction limiting device arranged to be started into action by the deenergization of said magnet valve and serving upon a chosen reduction of brake pipe pressure to reenergize said magnet valve; and a timing device serving periodically to interrupt said reenergization.

16. The combination of an automatic air brake system having a charged brake pipe; a brake valve; a motor mechanism operatively connected to said valve and arranged when reversely actuated to move said valve to application and lap positions respectively; a train controlling device serving when actuated to cause said motor mechanism to move the valve to application position in which air is discharged from the brake pipe; a device responsive to a chosen resulting pressure reduction and serving to actuate the motor mechanism to shift the valve to lap position; and a timing device put into action by the train control device and serving periodically to cause the motor mechanism to move the valve to application position.

17. In a train control device, the combination of a mechanism for transmitting actuations from track to moving train; an air brake system having a normally charged brake pipe; a brake valve having lap and application positions and serving to control brake pipe pressure; a motor mechanism operatively connected with said valve and serving in opposite positions of the motor mechanism to place said valve in lap and application positions respectively; a reduction limiting device arranged to limit reduction of brake pipe pressure by causing said motor mechanism to move the brake valve to lap position; a timing device arranged to cause said motor mechanism to move said brake valve to application position after successive time intervals; and means operated by said actuation transmitting mechanism and serving to actuate the motor mechanism to applying position and start said reduction limiting device and said timing device into action.

18. In a train control device, the combination of a mechanism for transmitting actuations from track to moving train; an air brake system having a normally charged brake pipe; a brake valve of the equalizing discharge type having lap and application positions and serving to control brake pipe pressure; a motor mechanism operatively connected with said valve and serving in opposite positions of the motor mechanism to place said valve in lap and application positions respectively; a reduction limiting device arranged to be actuated by a chosen pressure drop in the equalizing reservoir and serving to limit the reduction of brake pipe pressure by causing said motor mechanism to lap said valve; a timing device including a charged timing chamber having a fixed vent, arranged to actuate said motor mechanism to move said valve to application position after successive time intervals; and means operated by said actuation transmitting mechanism and serving to actuate the motor mechanism to move said valve to application position and start said reduction limiting device and said timing device into action.

19. In a train control device, the combination of an air brake system including a normally charged brake pipe and a brake valve for controlling the pressure therein; a motor mechanism constructed and arranged to move said brake valve to application position and back to lap; a timing device including a timing chamber and a vent port arranged when put into action to start the movement of said motor mechanism to application position; a manually operable valve for closing said vent port; a train control mechanism arranged when actuated to start said motor mechanism and said timing device into action; means for resetting said train control mechanism; and a device operated by such resetting and serving to move said vent closing valve to open position.

20. In a train control device, the combination of an air brake system including a normally charged brake pipe and a brake valve for controlling the pressure therein; a motor mechanism constructed and arranged to move said brake valve to application position and then to lap position; a timing device including a timing chamber, and a vent port serving, when in action, to start the movement of said motor mechanism to application position; a manually operable valve for closing said vent port; a train control mechanism comprising two independent units, one responsive to danger and the other to caution indications; connections whereby both said mechanisms serve, when actuated, to start said motor mechanism and said timing device into action; means for resetting said train control units; connections whereby the actuation of one of said control units permits and the actuation of the other of said control units prevents the closing of said vent valve, and means whereby the resetting of said control device to normal condition opens said vent valve if the latter be closed.

21. In a train control device, the combination of an air brake system including a normally charged brake pipe and a brake valve for controlling the pressure therein, a motor mechanism constructed and arranged to move said brake valve to application position and then upon the completion of a desired pressure reduction to move said valve back to lap position; a timing device arranged, when in action, to start the movement of said motor mechanism to application position at the termination of successive time intervals; a manually operable device for terminating the action of said timing device; a train control mechanism including independently operable units, one for danger and the other for caution actuations, and both arranged to start said motor mechanism and said timing device into action; means for resetting said train control units; connections whereby the actuation of the danger control unit prevents, and the actuation of the caution control unit permits the actuation of said manually controlled device; and a mechanism operated by the resetting of the train control device and serving to rest said manually controlled device to neutral position.

In testimony whereof I have signed my name to this specification.

CHARLES A. CAMPBELL.